Feb. 13, 1934.  W. V. BROWN  1,946,834
TRUCK TANK UNDERFRAME
Original Filed March 9, 1931  3 Sheets-Sheet 1
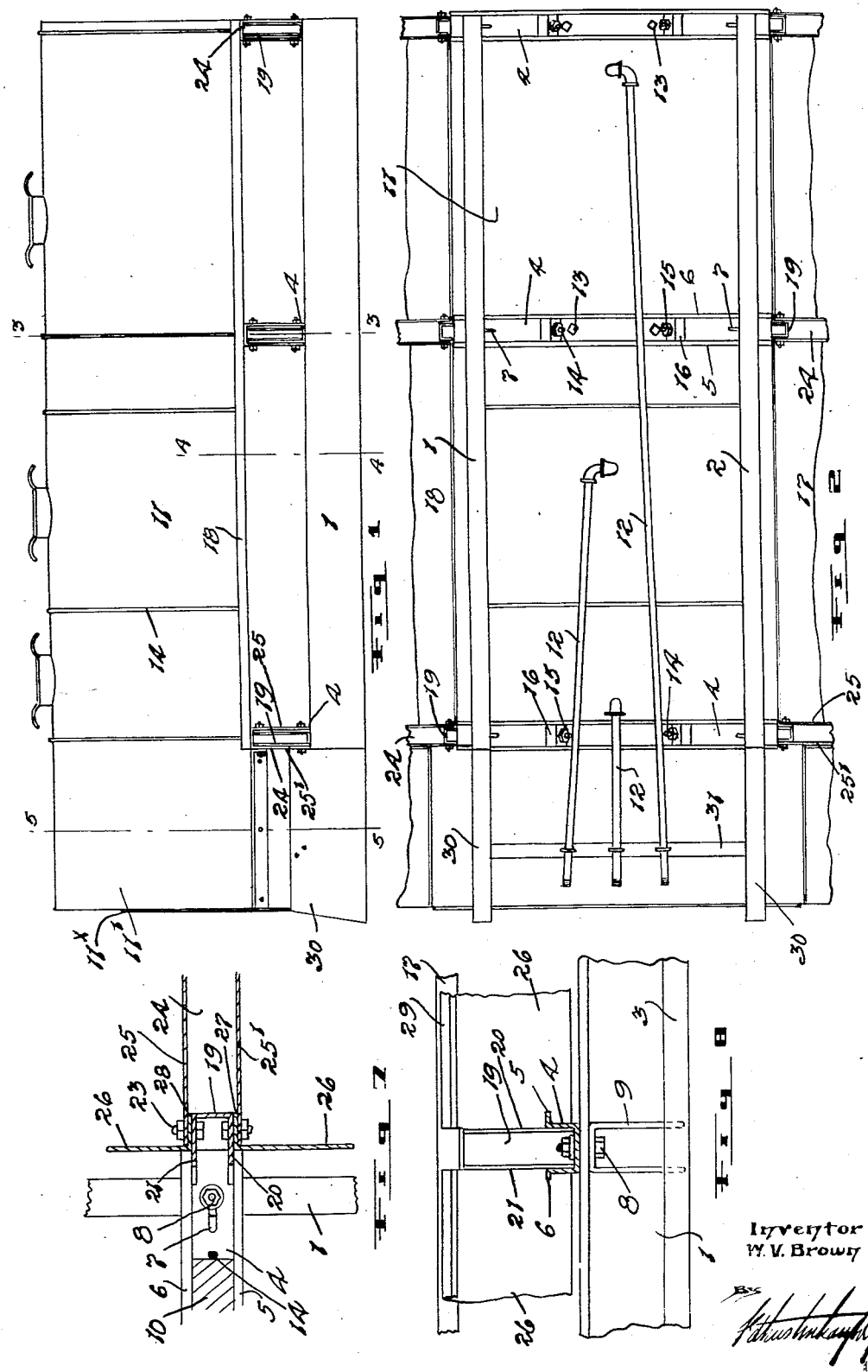
Inventor
W. V. Brown Feb. 13, 1934.　　　W. V. BROWN　　　1,946,834
TRUCK TANK UNDERFRAME
Original Filed March 9, 1931　　3 Sheets-Sheet 2
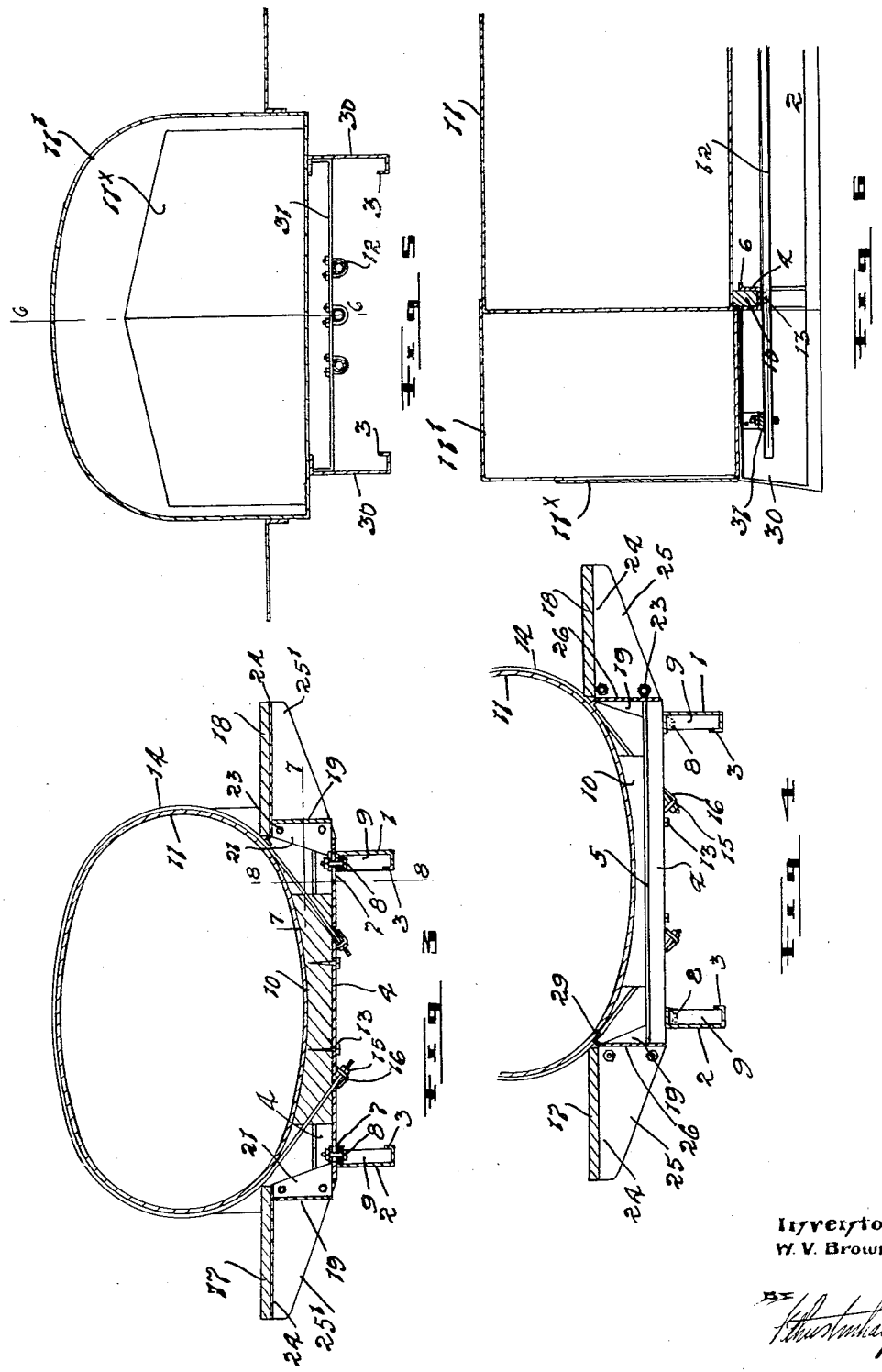
Inventor
W. V. Brown

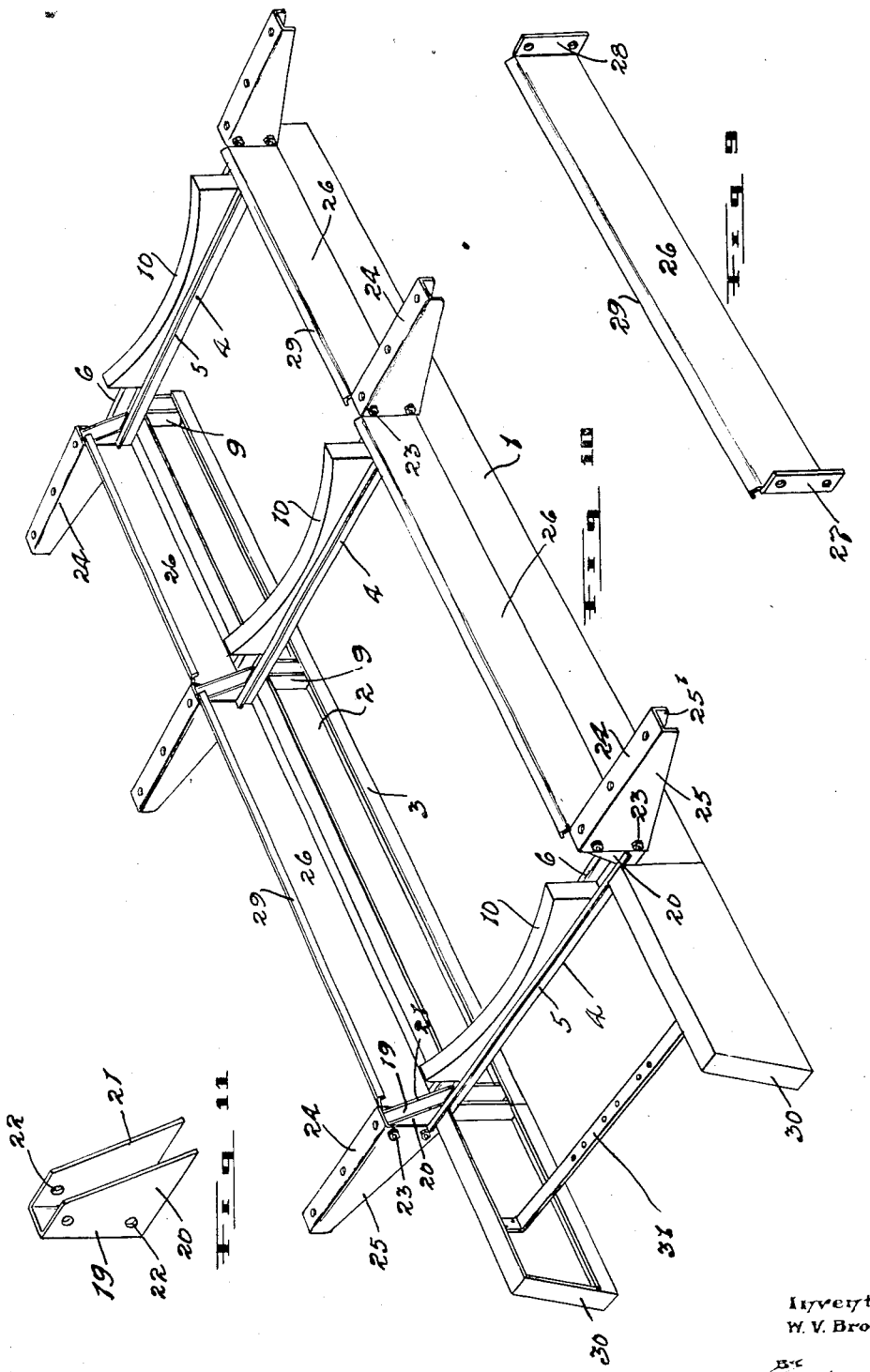

Patented Feb. 13, 1934

1,946,834

UNITED STATES PATENT OFFICE 1,946,834

TRUCK TANK UNDERFRAME

Walter V. Brown, Brandon, Manitoba, Canada

Application March 9, 1931, Serial No. 521,179, and in Canada June 30, 1931. Renewed July 21, 1933

5 Claims. (Cl. 280—5)

The invention relates to improvements in truck tank under frames and an object of the invention is to provide an under frame formed for the greater part from sheet metal parts bent into the desired shape and all arranged so that they can be easily and quickly assembled and such that the completed structure has a good appearance and is comparatively light yet amply strong for the work for which it is intended.

A further object is to provide an under frame having those points most susceptible to fracture or failure amply reinforced in a simple yet efficient manner and also such that the bolster tips with the platforms carried thereby can be easily and quickly removed for shipping or other purposes and further a frame structure having the sills mounted in respect to the bolsters such that they can be readily adjusted to accommodate varying widths of truck chassis.

With the above more important and other minor objects in view which will become more apparent as the description proceeds, the invention consists essentially in the arrangement and construction of parts hereinafter more particularly described, reference being had to the accompanying drawings, in which:—

Fig. 1 is a side view of the truck tank under frame with the tank thereon.

Fig. 2 is an inverted plan view of the parts appearing in Figure 1.

Fig. 3 is a vertical cross sectional view at 3—3 Figure 1.

Fig. 4 is a vertical cross sectional view at 4—4 Figure 1.

Fig. 5 is a vertical cross sectional view at 5—5 Figure 1.

Fig. 6 is a vertical sectional view at 6—6 Figure 5.

Fig. 7 is a horizontal sectional view at 7—7 Figure 3.

Fig. 8 is an enlarged detailed horizontal sectional view at 8—8 Figure 3.

Fig. 9 is a perspective view of one of the side plates or aprons.

Fig. 10 is a perspective view of the truck tank under frame.

Fig. 11 is a perspective view of one of the bolster brackets.

In the drawings like charactrs of reference indicate corresponding parts in the several figures.

The truck tank under frame as herein disclosed is made for the greater part from sheet metal plates bent to form the necessary parts, the majority of which are duplicated and the finished or assembled structure is relatively light yet of ample strength and has a particularly good and finished appearance.

The sills 1 and 2 of the frame are identical, being formed from relatively heavy gauge sheet metal plates bent into a substantially channel iron cross section, the lower flange of the formed channel iron being provided with an up turned longitudinally extending lip 3. The sills are cut a predetermined length depending on the size of the truck chassis on which the frame is to be mounted and when they are placed on the frame, the flanges are inturned.

On the upper flanges of the sills, I mount a plurality of suitably spaced bolsters 4 which also are made from relatively heavy gauge sheet metal bent into channel shape and having the opposing flanges thereof provided at their upper edges with out turned lengthwise extending reinforcing lips 5 and 6. The bolsters are arranged parallel and are positioned forwardly, rearwardly and intermediately of the sills and in the base of each bolster adjoining the end thereof I provide a longitudinally extending slot 7 which receives a fastening bolt 8 passing down through the upper flange of the underlying sill and through a yoke-shaped reinforcing saddle 9 placed in an upright position as shown best in Figure 8 within the channel of the sill. The saddle is formed from a heavy gauge sheet metal plate bent the required shape and the lower ends of the legs of the saddle rest on the bottom flange of the sill and are prevented from escaping inwardly by the upturned lip 3 thereof.

When the bolts are tightened up, they effectively fasten the bolsters to the sills and in this connection, I might point out that the slots 7 permit the sills to be set in relation to the chassis, that is to say, the sills can be moved in or out to accommodate the width of the chassis on which the sills rest. It will be particularly observed that the saddles amply reinforce the sills at the points where the load is applied on the sills through the bolsters and that the lips 5 and 6 of the bolsters amply reinforce the bolsters against bending downwardly under the applied load. The saddles are welded to the back and bottom flange of the sill.

The flanges of the bolsters are up turned and in the channel of the bolster, I insert a wooden cradle 10 which has the bottom resting on the base of the bolster channel and the upper face thereof curved, the said curvature being designed to fit the under side of the customary oil, gasoline or other liquid tank 11. The tank 11 is customarily circular or elliptical shape and is subdivided into a number of compartments for containing different liquids and from the bottoms of these compartments a number of pipes indicated generally by the reference numeral 12 lead rearwardly to a suitable location on the rear end of the truck, the pipes passing rearwardly underneath the bolsters. The parts just described are of ordinary construction and form no part of the present invention.

The cradles 10 are fastened to the bolster by screws 13 screw threading upwardly through the bolster and into the cradles. The tank is held firmly seated on the cradles by fastening rods 14 passing over the top and around the sides of the tank and having their lower ends extending through the ends of the cradles and downwardly through the bottoms of the bolsters where they are screw threaded and fitted with nuts 15, angle plates 16 being provided against which the nuts are tightened up.

It is customary for truck frames of such kind to be provided at the opposite sides of the tank with lengthwise extending side platforms 17 and 18 and these platforms are supported according to my invention in the following manner.

To the end of each bolster, I attach a bolster bracket 19 formed from sheet metal bent into the shape best shown in Figure 11 and the side arms 20 and 21 of the bracket are entered in the end of the bolster and permanently welded to the side flanges of the bolster, it being observed, however, that the bracket extends beyond the end of the bolster and has the side arms supplied with bolt holes 22. To the bracket, I securely fasten by bolts 23 similar bolster tips 24, these bolster tips being all formed from sheet metal plates bent into the desired channel iron shape. It will be observed that the side flanges 25 and 25' of the bolster tips are tapered and that the inner ends of the bolster tips span the projecting ends of the brackets, the inner or wide ends of the bolster tip flanges being attached by the bolts 23 mentioned which pass through the bolt holes 22 supplied in the bolster brackets.

The bolster tips are provided with suitable bolt holes and the upper faces thereof support the boards forming the platforms already mentioned, said boards being fastened securely to the bolster tips by the bolts passing through the holes last mentioned. The open spaces appearing between the adjacent bolster tips are closed by similar vertically disposed side plates or aprons 26 which are formed from substantially rectangular sheet metal plates supplied at their ends with out turned flanges 27 and 28 and at their upper edges with a longitudinally extending inturned hook shaped flange 29.

The apron or side plate is held in place in each instance by inserting the flanges 27 and 28 between the side flanges of the bolster tips and the side arms of the bolster brackets prior to fastening by the bolts 23. When the aprons are in place, their upper edges extend to the inner edges of the platform and the inturned hooked flanges 29 engage with the under side of the tank 11.

Customarily, tanks are provided at their rear ends with a box 11' for cans and the like, the box being provided with rear doors 11<sup>x</sup>. The dimensions of these boxes vary considerably, some having their bottoms extending downwardly below the tank a greater or less distance and others terminating in the plane of the bottom of the tank. In order to accommodate such varying sized boxes, I weld extension sills 30 to the rear ends of the main sills and choose the depth of the extension sills so that they will accommodate and support the bottom of the particular box located at the end of the tank. These extension sills are formed from sheet metal plates bent into a channel shape and having their front ends butted against and welded to the rear ends of the main sills. The extension sills carry a cross bar 31 which supports the rear ends of the pipes 12 already mentioned.

By making the various parts of the under frame from sheet metal and bending them into the various shapes shown, I provide not only a strong amply reinforced under frame but also a comparatively light under frame and as all parts are duplicated, they can be easily and quickly fabricated and assembled.

It will be also noted that the bolster tips and platforms can be readily removed from the remaining part of the frame and this is desirable for shipping purposes particularly where the frame has to be shipped in box cars, the doors of which have a limited width. If the bolster tips and platforms be removed by undoing the bolts 23, the under frame can be readily passed through a box car doorway. The completed under frame has a very pleasing and finished appearance when in use which is also an important consideration.

What I claim as my invention is:—

1. In a truck tank under frame, a pair of opposing longitudinally extending sheet metal sills of channel iron cross section, spaced similar sheet metal bolsters of channel iron cross section having their ends resting on the top flanges of the sills, said bolsters having the side flanges thereof up turned and provided with out turned reinforcing lips, sheet metal reinforcing saddles welded to the sills between the flanges of the sills and located directly underneath the overlying ends of the bolsters and fastening bolts securing the bolsters to the sills, the bolts passing through the saddles.

2. In a truck tank under frame, a pair of opposing longitudinally extending sheet metal sills of channel iron cross section, spaced similar sheet metal bolsters of channel iron cross section having their ends resting on the top flanges of the sills, said bolsters having the side flanges thereof up turned and provided with out turned reinforcing lips, sheet metal reinforcing saddles welded to the sills between the flanges of the sills and located directly underneath the overlying ends of the bolsters and fastening bolts securing the bolsters to the sills, the bolts passing through the saddles and through longitudinally extending slots provided in the bases of the bolsters.

3. In a truck tank under frame, a pair of opposing longitudinally extending sheet metal sills of channel iron cross section, spaced similar sheet metal bolsters of channel iron cross section having their ends resting on the top flanges of the sills, said bolsters having the side flanges thereof up turned and provided with out turned reinforcing lips, sheet metal reinforcing saddles welded to the sills between the flanges of the sills and located directly underneath the overlying ends of the bolsters, fastening bolts securing the bolsters to the sills, the bolts passing through the saddles and tank supporting cradles resting within the channels of the bolsters and suitably secured thereto.

4. In a truck tank under frame, in combination, transversely extending sheet metal bolsters of channel iron cross section and having the flanges thereof up turned, upstanding sheet metal brackets presenting side arms entering the channel at the ends of the bolsters and permanently welded thereto and outstanding bolster tips formed from sheet metal plates bent to provide down turned side flanges engaging the sides of the brackets and bolted thereto.

5. In a truck tank under frame, in combination, transversely extending sheet metal bolsters of channel iron cross section and having the flanges thereof up turned, upstanding sheet metal brackets presenting side arms entering the channel at the ends of the bolsters and permanently welded thereto, outstanding bolster tips formed from sheet metal plates bent to provide down turned side flanges engaging the sides of the brackets and bolted thereto and side closure plates extending between the brackets and provided with outstanding end flanges entered between the tips and the brackets and fastened by the latter bolts.

WALTER V. BROWN.